United States Patent [19]

Pratt

[11] 3,770,609

[45] Nov. 6, 1973

[54] POTENTIOMETRIC CELL WITH DUAL SLOPE DISPLAY METER CALIBRATION CIRCUIT

[75] Inventor: Stanley L. Pratt, Riverside, Calif.

[73] Assignee: Beckman Instruments, Inc., Fullerton, Calif.

[22] Filed: May 4, 1972

[21] Appl. No.: 250,286

[52] U.S. Cl. ..... 204/195 M, 204/195 R, 204/195 G, 204/1 T
[51] Int. Cl. .......................................... G01n 27/46
[58] Field of Search ............ 204/1 T, 195 G, 195 L, 204/195 R, 195 M

[56] References Cited
UNITED STATES PATENTS
3,591,464    7/1971    Frant et al...................... 204/195 M Primary Examiner—T. Tung
Attorney—James M. Thomson et al.

[57] ABSTRACT

A system for performing analysis of the ion concentration of test solutions including means for sensing the potential developed between a reference electrode and an ion selective electrode immersed in the test solution, and means for amplifying and displaying the potential. The amplifier and display means include two independent span adjustment controls, each effective over part of the span of the meter. Automatic stepless transfer is provided between the two span adjustment controls, for example at mid-scale. This enables increased accuracy when displaying ion concentrations by permitting a dual slope straight line approximation to the typically nonlinear millivolt characteristic of the ion selective electrode such as occurs in the presence of interfering ions.

3 Claims, 1 Drawing Figure

PATENTED NOV 6 1973 3,770,609

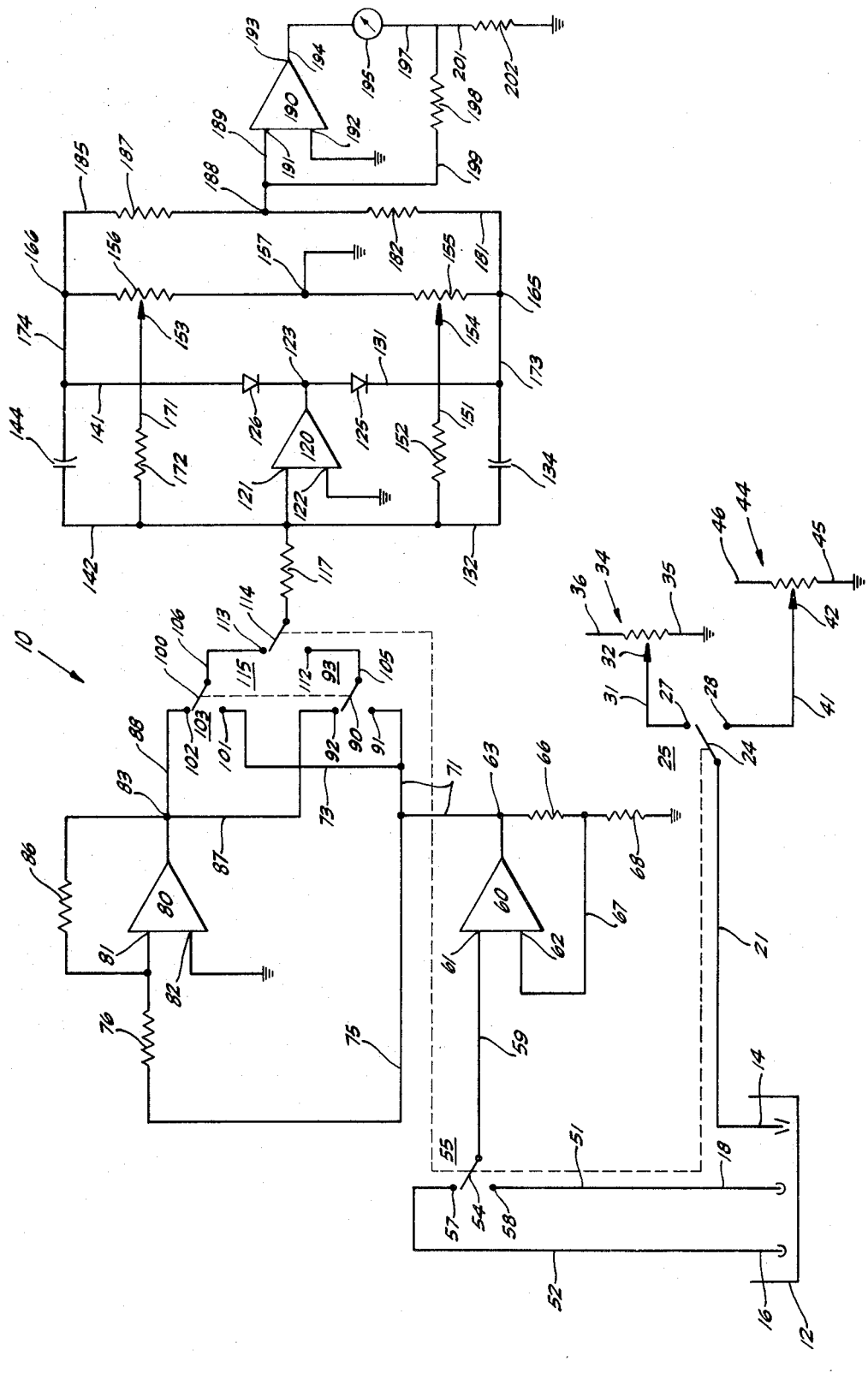

POTENTIOMETRIC CELL WITH DUAL SLOPE DISPLAY METER CALIBRATION CIRCUIT

BACKGROUND OF THE INVENTION

This invention relates to a system for determining the concentration of a selected ion within a test solution. More particularly the invention concerns a system for sensing, amplifying and accurately displaying the potential developed between an ion selective sensing electrode and a reference electrode immersed in the test solution.

The analysis of test solutions by monitoring electrochemical reactions is well known, and in particular the use of potentiometric cells in determining ion concentration is known. Such cells, as commonly used for monitoring ion concentrations, include a cell confining a test solution in which a reference electrode and one or more ion selective sensing electrodes are immersed. The concentration of the ion of interest is determined by measuring and displaying the potential developed between the reference electrode and a given ion selective sensing electrode.

In the design of a meter suitable for displaying the concentration of a particular ion, it is appropriate to use a logarithmic scale, since the millivolt output of the sensing electrode is generally proportional to the logarithm of the electrochemical activity of the particular ion present. Thus, it is well known that an ideal electrode would exhibit Nernstian response, i.e., at 25°C an ideal electrode would always produce a 59.16 millivolt change per ten fold change of concentration of the ion being sensed. Under such ideal conditions the potential or millivolt output of the electrode would be linear over several decades of change of ion concentration.

Unfortunately, the change in millivolt output of a given electrode depends not only upon the concentration of the primary ion of interest, but also upon its relative ionic strength and upon the presence and nature of other interfering ions. For these reasons it is often found that equal logarithmic increments of concentration of the primary ion do not result in identical millivolt changes. A display meter having a single continuously adjustable span or slope control and a continuously adjustable asymmetry or offset control can be calibrated to such a signal at only two points on the meter display. If such a meter is used, then for display of an ion characteristic having more than one decade of concentration change, significant errors in the output displayed on the meter will result.

If on the other hand a meter were to be used which pro-vided two independent span adjusting controls, each effective over part of the meter span then three point calibration of the meter display would be possible, with correspondingly decreased errors.

SUMMARY OF THE INVENTION

Accordingly it is an object of the invention to provide an improved system for determining and displaying the concentration of an ion within a test solution.

It is another object of the invention to provide in such a system, a display meter that includes two independent span adjustment controls, each effective over part of the span of the meter.

It is a further object of the invention to provide in a meter having such span adjustment controls, means for automatic stepless transfer between the two span adjustment controls, for example at mid-scale, whereby an ion concentration display of increased accuracy is provided.

The above and other objects of the invention are attained in a system which includes means for confining a test solution with a reference electrode and at least one ion selective sensing electrode immersed therein. The potential developed between the reference electrode and a given sensing electrode is amplified and provided as the input signal to a differential amplifier having a common input resistor and two alternately operable feedback networks. For a negative input to the resistor a first diode connects one of the feedback networks through a downscale span potentiometer, while for a positive input another diode connects the other feedback resistor through an upscale scan potentiometer. By use of the alternate feedback networks, a polarity separator circuit is provided having two outputs, one for positive outputs from the amplifier and the other for negative outputs from the amplifier. Either positive or negative input voltages to the amplifier are continuously and linearly adjustable by the downscale and upscale span potentiometers for full deflection from the meter center point. Accordingly this arrangement allows different ion selective electrodes to be connected and standardized by a three point procedure by calibrating one point at meter zero and one additional point at each side of meter zero.

BRIEF DESCRIPTION OF THE DRAWINGS

The foregoing and other objects of the invention are apparent from the following detailed description of the invention taken in conjunction with the accompanying drawing which is a schematic diagram of one preferred embodiment of the invention.

DETAILED DESCRIPTION OF THE INVENTION

Figures 1, 2, 3:
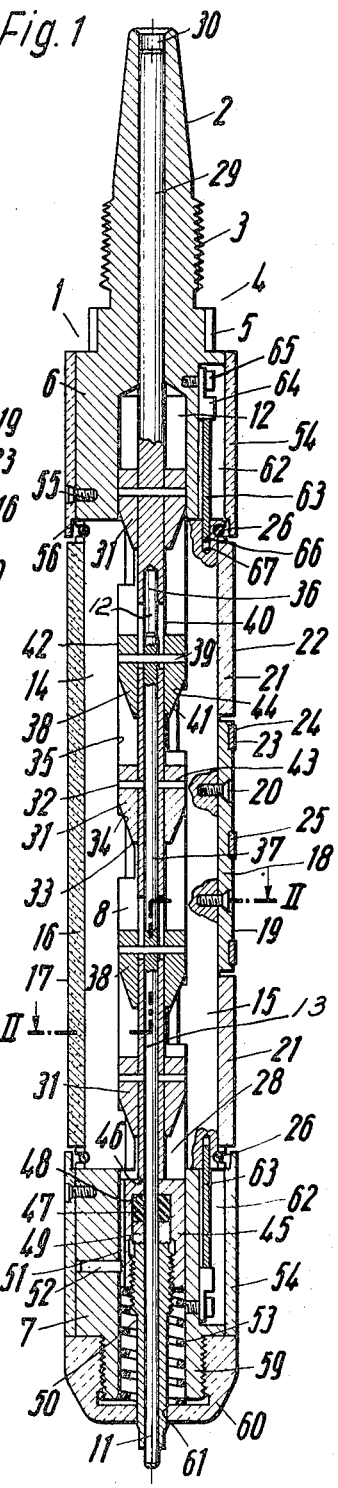

Referring now to the drawing, one preferred embodiment of the invention is illustrated comprising a system 10 for sensing, amplifying and accurately displaying ion concentrations of a test solution. The system includes a cell 12 of conventional design adapted to hold a sample of the test solution within which a reference electrode 14 and two ion selective sensing electrodes 16, 18 are immersed. The reference electrode can comprise a standard calomel reference electrode of well-known design. The ion selective electrodes are also of conventional design and may comprise glass electrodes such as those disclosed in U.S. Pat. Nos. 3,278,399 and 3,143,448. If desired, the sensing electrodes can be of other conventional type.

Reference electrode 14 is connected by a conductor 21 to the movable arm 24 of a switch 25. Switch 25 further includes fixed contacts 27, 28 which are adapted for selective connection with movable arm 24. Contact 27 is connected by a conductor 31 to the movable arm 32 of a potentiometer 34. One end terminal 35 of the potentiometer is grounded and the other end terminal 36 of the potentiometer is connected to a suitable d.c. source, not illustrated, which provides energization for the electrodes in a well-known manner when movable arm 24 is associated with contact 27.

Contact 28 of switch 25 is connected via a conductor 41 to a movable arm 42 of a potentiometer 44. One end 45 of the potentiometer is grounded and the other end 46 is adapted to be connected to a d.c. source, again not illustrated, to provide a different level of energization for the reference electrode when movable arm 24 is associated with contact 28. The movable arm of either of the potentiometers can be adjusted to vary the energization of reference electrode 14 whereby a continuously adjustable asymmetry or offset control is provided for the system, as will become apparent hereinafter.

Electrode 18 is connected by a conductor 51 to a fixed contact 58 of a switch 55. In similar fashion, electrode 16 is connected by a conductor 52 to a fixed contact 57 of switch 55. A movable arm 54 of switch 55 is connected by a conductor 59 to a positive input terminal 61 of a high input impedance differential amplifier 60. Output terminal 63 of amplifier 60 is connected to one end of a resistor 66. The other end of resistor 66 is connected by a feedback conductor 67 to the negative input terminal 62 of the amplifier. The other end of resistor 66 is also connected to one end of a resistor 68 having its other end grounded. In the configuration shown, amplifier 60 is a conventional high input impedance differential amplifier connected in a noninverting mode with a voltage gain fixed by the ratio of resistances 66 and 68.

Output terminal 63 of amplifier 60 is connected by a conductor 71 to a fixed contact 91 of a polarity reversing switch 93. In similar fashion output terminal 63 is connected by conductors 71, 73 to a fixed contact 101 of a polarity reversing switch 103. The output terminal is also connected via conductors 71, 75 to one end of an input resistor 76 having its other end connected to the negative input 81 of a differential amplifier 80. Positive input terminal 82 of the amplifier is connected to ground. An output terminal 83 of amplifier 80 is connected to one end of a feedback resistor 86 having its other end connected to negative input terminal 81. Differential amplifier 80 is of conventional design and is connected, in the configuration shown, as a unity gain inverting amplifier.

Output terminal 83 of amplifier 80 is connected by a conductor 87 to a fixed contact 92 of switch 93 and terminal 83 is also connected by a conductor 88 to a fixed contact 102 of switch 103.

A movable arm 90 of switch 93 is connected by a conductor 105 to a fixed contact 112 of a switch 115, and a movable arm 100 of switch 103 is connected by conductor 106 to a fixed contact 113 of switch 115. A movable arm 114 of switch 115 is connected to one end of an input resistor 117 having its other end connected to the negative input terminal 121 of a differential amplifier 120. The positive input terminal 122 of the amplifier is connected to ground.

An output terminal 123 of amplifier 120 is connected to the anode of a diode 125 and to the cathode of a diode 126. The cathode of diode 125 is connected by a conductor 131 to one terminal of a capacitor 134 which has its other terminal connected by a conductor 132 to negative input terminal 121 of the amplifier. In similar fashion, the anode of diode 126 is connected by a conductor 141 to one terminal of a capacitor 144 having its other terminal connected by a conductor 142 to negative input terminal 121 of the amplifier.

A downscale span potentiometer 155 and an upscale span potentiometer 156 are provided each having one end connected to a grounded terminal 157. The other end of potentiometer 155 is connected to a first output terminal 165 and the other end of potentiometer 156 is connected to a second output terminal 166.

A movable arm 154 of potentiometer 155 is connected by a conductor 151 to one terminal of a feedback resistor 152 having its other terminal connected to conductor 132 and ultimately to negative input terminal 121 of the amplifier. In similar fashion, a movable arm 153 of potentiometer 156 is connected by a conductor 171 to one terminal of a feedback resistor 172 having its other terminal connected to conductor 142 and ultimately to negative input terminal 121 of the amplifier. Output terminal 165 is connected via a conductor 173 and conductor 131 to the cathode of diode 125. In similar fashion output terminal 166 is connected via a conductor 174 and conductor 141 to the anode of diode 126.

Amplifier 120 is a conventional differential amplifier which, in the configuration shown, is connected as an inverting polarity separator. Accordingly for negative inputs to the amplifier the gain is determined by feedback resistor 152 via span potentiometer 155. However for positive inputs to the amplifier the gain is determined by feedback resistor 172 via span potentiometer 156. Since both negative feedback circuits have high forward gain, the diode forward voltage drops are negligibly small when referred to the amplifier input. Accordingly any polarity switching discontinuities near zero input voltage are insignificant. This enables stepless transfer between the potentiometers. Feedback capacitors 134, 144 limit the upper frequency bandwidth and suppress a.c. signals, such as those of input power frequency, that might cause the span controls not to be independent near meter zero values.

Output terminal 165 is connected by a conductor 181 to one terminal of a summing resistor 182 and output terminal 166 is connected by a conductor 185 to one terminal of a summing resistor 187. The other terminals of summing resistors 182, 187 are each connected to a common terminal 188.

Terminal 188 is connected by a conductor 189 to a negative input terminal 191 of a differential amplifier 190. The positive input terminal 192 of amplifier 190 is connected to ground. An output terminal 193 of amplifier 190 is connected by a conductor 194 to the positive terminal of a meter 195. The other terminal of meter 195 is connected by a conductor 197 to one terminal of a feedback resistor 198 having its other terminal connected by a conductor 199 to negative input terminal 191 of the amplifier. The other terminal of meter 195 is also connected via conductor 197 and conductor 201 to one terminal of a resistor 202 having its other terminal connected to ground.

Amplifier 190 is a conventional differential amplifier which, in the configuration shown, acts as a summing amplifier for the output of the polarity separating amplifier. Feedback resistor 198 determines the voltage gain of the amplifier and resistor 202 determines the resulting current through meter 195.

As shown, the movable arms of switches 93, 103 are connected together for gang operation. In similar fashion, the movable arms of switches 25, 55 and 115 are connected together for gang operation.

In operation, the circuit illustrated can be utilized for displaying, selectively, the potential between reference electrode 14 and either of sensing electrodes 16, 18. Furthermore, the sensing electrodes can be of either cation or anion type. The electrode selected for display is determined by ganged function switches 25, 55, 115 with switch 55 selecting the electrode and switch 25 selecting the asymmetry or offset potentiometer to be utilized with that electrode. Switch 115 connects the input of the polarity selector circuit to the corresponding polarity switch 93, 103. The polarity switches are then moved to the appropriate position to display either positive (cation) or negative (anion) signals.

When the appropriate electrode, standard solution and polarity switches have been selected, the appropriate offset potentiometer 34, 44 is employed to set the mid-scale position of the meter. In the preferred embodiment the mid-scale position is at zero, although it can be set at another suitable value if desired. After mid-scale standardization, standard solutions are employed in the septum and the span adjust potentiometers 155, 156 are utilized to standardize the meter at two additional points, one point on either side of meter zero. Consequently the meter output can be calibrated to display ion concentration directly with higher accuracy than was heretofore possible with two point standardized meters. This enables satisfactory use of the ion concentration sensing system to measure concentrations of a primary ion in the presence of secondary or interfering ions.

With such an arrangement the meter span need not represent exactly two decades of concentration change, nor must it be logarithmic. However the circuit arrangement does provide increased accuracy when displaying ion concentration by allowing a dual slope straight line approximation to the typically non-linear millivolt characteristics of ion selective electrodes in the presence of interfering ions.

I claim:

1. An ion concentration sensing and display system comprising
    ion selective sensing means having ion selective electrode means adapted for immersion in a test solution for monitoring a potential related to the ion concentration of a selected ion within the solution, said sensing means including adjustable offset potentiometer means for adjusting the offset of said potential with respect to a given ion concentration;
    polarity separating amplifier means connected to said sensing means for producing outputs of positive and negative polarity, said polarity separating amplifier means including means for individually adjusting the amplifier gain with respect to each of said outputs; and
    display means connected to said polarity separating amplifier means for directly displaying the concentration of the selected ion.

2. The ion concentration sensing and display system of claim 1 further including polarity inverting amplifier means and polarity switching means for selectively interposing said invert-ing amplifier means between said sensing means and said polarity separating amplifier means whereby the ion concentration of anions or cations can be directly displayed.

3. The ion concentration sensing and display system of claim 2 wherein said display means includes summing amplifier means connected to said polarity separating amplifier means and a display meter connected to the output of said summing amplifier for directly displaying ion concentration.

* * * * *